Aug. 29, 1944.  A. N. GARIN  2,357,098
TRANSFORMER
Filed July 23, 1940
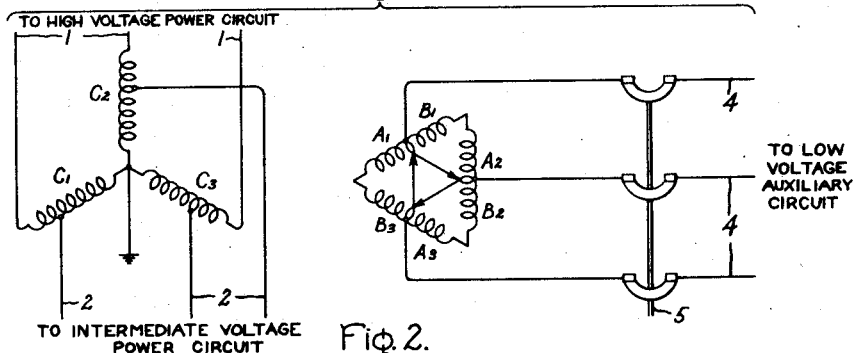
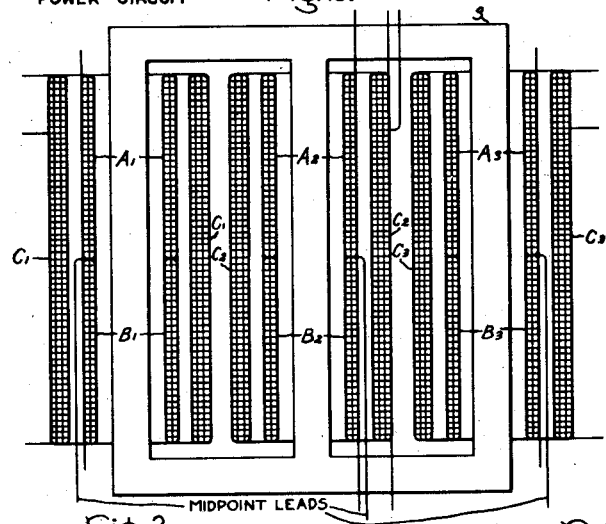
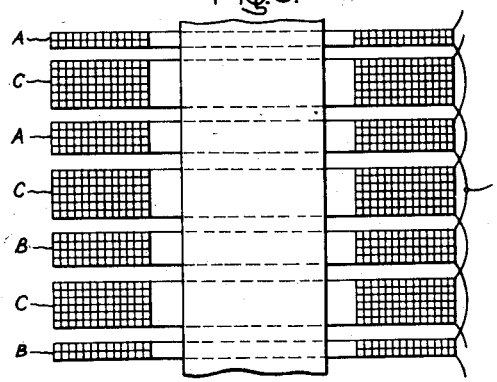
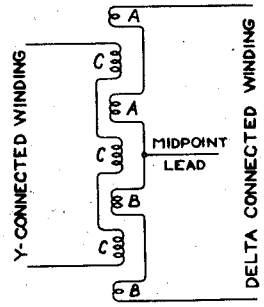
Inventor:
Alexis N. Garin,
by Harry E. Dunham
His Attorney.

Patented Aug. 29, 1944

2,357,098

UNITED STATES PATENT OFFICE 2,357,098

TRANSFORMER

Alexis N. Garin, Pittsfield, Mass., assignor to General Electric Company, a corporation of New York Application July 23, 1940, Serial No. 346,917

12 Claims. (Cl. 171—119)

This invention relates to electric transformers and more particularly to improvements in delta-connected windings for three-phase Y-connected transformers.

As here used the term "three-phase transformer" means either a single three-phase transformer or a bank of three single-phase transformers. "Y-connected" refers primarily to both the primary and secondary windings of the transformer.

It is not unusual to provide Y-connected transformers with a delta-connected tertiary winding for the purpose of substantially short circuiting third harmonic voltages in the Y-connected system. These third harmonic voltages are usually present to a greater or less extent in the line-to-neutral voltages of three-phase systems and if they are allowed to circulate triple-frequency currents through the power lines, these currents often cause objectionable effects, such as interference with adjacent telephone circuits. As the third harmonic voltages in the separate phases of a three-phase system are all in phase with each other, they add arithmetically in the loop circuit constituting the tertiary delta winding, and if the tertiary delta winding is closely coupled to the Y-connected windings and if the delta winding has a low impedance it acts as a virtual short circuit of the third harmonic voltages and confines substantially all of the third harmonic current to the delta winding.

It has also been found that the unbalance in the three-phase system voltage caused by a single-phase line-to-ground or line-to-neutral fault produces objectionable effects somewhat similar to those of a third harmonic voltage except that the frequency is the same as that of the fundamental. In terms of the mathematical theory of symmetrical phase sequence components, this class of effects is associated with a zero sequence voltage by which it is meant that one of the three sets of symmetrical components of the unbalanced three-phase voltage will be three equal voltages which are in phase with each other and which are present in each of the three phases respectively. This set of components is called the zero sequence component. The tertiary delta winding, therefore, provides a relatively low impedance path for zero sequence currents to flow in and the magnitude of these currents is used as a measure of line-to-ground faults, suitable relays often being used to respond to these zero sequence currents so as to control the operation of protective circuit breakers.

It is, therefore, important from the standpoints of third harmonic current suppression, as well as of suppression of zero phase sequence voltages of fundamental frequency, and of line-to-ground fault relaying, to have a low impedance tertiary delta winding which is closely coupled to the Y-connected windings of the transformer so as to cause a minimum voltage drop between the Y-connected circuit and the delta winding.

The tertiary delta winding usually need not be wound for as high a voltage as the main Y-connected winding and thus it provides an attractive source of low voltage current for which there is almost always a use in power stations. However, the close coupling between the tertiary delta winding and the main Y-connected windings permits power at practically the full capacity of the transformer to flow into a fault on the low voltage load circuit connected to the tertiary delta winding. Consequently, it is necessary to provide the low voltage load circuit with large power capacity, and therefore expensive, current interrupting protective equipment.

An object of this invention is to provide a tertiary delta winding which will inherently limit the power which can flow through it from the main transformer winding into a fault on its load circuit without adversely affecting its ability to suppress third harmonic voltages or its ability to permit large line-to-ground fault currents to flow. In terms of the theory of symmetrical phase sequence components the characteristic of the tertiary delta winding which limits the flow of three-phase fault current from the high voltage windings to such a fault on a low voltage circuit supplied by the delta winding is called a high positive sequence impedance. The characteristic which is desirable from the standpoint of third harmonic suppression and line-to-ground fault protection is known as a low zero sequence impedance. Another way of stating this is to say that the tertiary delta winding should be loosely coupled to the main transformer windings for purposes of power transmission and should be closely coupled thereto for purposes of third harmonic suppression and line-to-ground fault relaying.

The invention will be better understood from the following description taken in connection with the accompanying drawing and its scope will be pointed out in the appended claims.

In the drawing, Fig. 1 illustrates diagrammatically the circuit arrangement of a transformer embodying my invention, Fig. 2 is a cross-sectional view of the windings and core of a concentric type transformer embodying the invention, Fig. 3 is a similar view of one phase of an interleaved type of transformer which embodies the invention and Fig. 4 is a circuit diagram of Fig. 3.

Referring now to Figs. 1 and 2 of the drawing, the transformer is shown by way of example as an autotransformer provided with three windings $C_1$, $C_2$ and $C_3$ constituting respectively the phase windings of a Y-connected autotransformer. It will, however, be understood that my invention is not limited to an autotransformer and that separate insulated Y-connected primary and secondary windings may be used if desired. This autotransformer is arranged to transmit power between a high voltage circuit 1 and a medium voltage circuit 2. A tertiary delta winding has each of its phase windings divided into equal sections A and B. As shown in Fig. 2, these windings are mounted on a conventional three-legged silicon steel core 3 in such a way that the low voltage tertiary delta phase windings A—B are surrounded by the high voltage autotransformer windings C. It will also be seen that the "A" halves of each of the phases of the tertiary delta occupy one-half of each core leg and the "B" halves occupy the other half of each core leg. A low voltage load circuit 4 is connected to the midpoints of the phase windings of the delta by means of a circuit breaker 5. The voltage of the circuit 4 will therefore be the three-phase delta voltage represented by the triangle which interconnects the midpoints of the phase windings of the delta winding.

The physical division of the Y-connected C windings into series and common autotransformer sections has not been indicated in Fig. 2 but it will be understood that conventional autotransformer practice is followed in this respect.

I have found that with this arrangement the fault current on the circuit 4 is effectively limited, while at the same time the effectiveness of the delta winding with respect to third harmonics and line-to-ground faults on the high voltage circuits is not adversely affected. This result is explained by the theory of symmetrical phase sequence components as follows. It can be shown by that theory that the positive phase sequence leakage impedance between the Y and delta windings is $\frac{1}{2}Z_{C-A}+\frac{1}{2}Z_{C-B}+\frac{1}{2}Z_{A-B}$ and that the zero phase sequence leakage impedance between these windings is $$\frac{1}{2}Z_{C-A}+\frac{1}{2}Z_{C-B}-\frac{1}{4}Z_{A-B}$$

Thus, the positive sequence impedance is larger than the zero sequence impedance by $\frac{3}{4}Z_{A-B}$.

In the above expressions all the Z's are percentage leakage impedances, on a common k. v. a. basis, between the coils indicated by the subscripts, that is to say, they are the percentage impedances offered to the transfer of current between the coils indicated by the subscripts by transformer action between such coils.

The arrangement shown in Fig. 2 produces a large $Z_{A-B}$ because the coils A and B are separated as distinguished from being interwound, so that there will be a relatively large leakage flux between them, whereas the relation between coil C and coils A and B taken together is such that there is very little leakage flux, as these coils are wound one on top of the other and occupy the same portions of each core leg.

Fig. 2 is not drawn to scale in that in practice the height of the core and coils will usually be very much greater in proportion to the thickness of the windings. For example, actually the thickness of the windings (not their diameter) would be of the order of one or two inches whereas their length in the axial direction would be of the order of eighty-five inches. This makes $Z_{A-B}$ much larger in relation to $Z_{C-AB}$.

While making the two sets of windings A and B duplicates is convenient for manufacture and also for securing a large difference between the zero and the positive phase sequence leakage impedances of the transformer, yet, so far as the principle and the successful operation of the present invention is concerned, such duplication is not necessary and lines 4, 4, 4 need not tap the corresponding phases of the delta windings exactly at their midpoints but may do so at other than midpoints; and such procedure may be useful when a predetermined ratio of positive to zero phase sequence impedance is to be secured. In this latter, more general, case in which A and B are not alike in turns or otherwise, the percentage values of the zero and the positive phase sequence leakage impedances, $Z_0$ and $Z_+$ respectively, of the transformer are $$Z_0 = pZ_{A-C} + (1-p)Z_{B-C} - p(1-p)Z_{A-B}$$

$$Z_+ = \frac{1}{2(1-3p+3p^2)}[(1-p)(2-3p)Z_{B-C} + p(1-p)Z_{A-B} - p(1-3p)Z_{A-C}]$$

in which $p$ is the ratio of the turns of A to the total turns of A and B; and therefore a specified ratio, $k$, of zero to positive phase sequence impedance can be secured by modifying the component impedances $Z_{A-B}$, $Z_{A-C}$ or $Z_{B-C}$, or the ratio $p$ in the following equation in the most convenient manner to satisfy the equation $$k = \frac{Z_0}{Z_+} = 2(1-3p+3p^2)$$
$$\left[\frac{pZ_{A-C}+(1-p)Z_{B-C}-p(1-p)Z_{A-B}}{(1-p)(2-3p)Z_{B-C}+p(1-p)Z_{A-B}-p(1-3p)Z_{A-C}}\right]$$

While the delta winding has been described and shown as a tertiary winding there is no inherent reason why it could not also be used as a secondary winding if desired.

The invention is not limited to transformers employing concentric windings and may equally well be embodied in transformers having interleaved windings. An example of the latter is shown in Figs. 3 and 4 for one phase. The Y-connected winding C is shown by way of example as being divided into three serially-connected coils. The sections A and B of one phase of the delta-connected winding are each divided into separate serially-connected disk or pancake type coils interleaved between different sets of the coils C, and the line terminal is indicated at the midpoint or between the sections A and B.

The inner and outer coils of the sections A and B of the delta-connected winding are shown as provided with different numbers of turns in order to make it clear that the invention is not limited to equal turns or to some particular ratio of turns.

As shown in Fig. 4, only one Y-connected winding is indicated. This winding may be either an autotransformer winding or a separate and similar winding may be added so as to constitute a secondary Y-connected winding.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a leg of a transformer core, seven interleaved pancake coils thereon, the second, fourth and sixth coils when counting from one end of the series being equal and serially connected to form one phase of a Y-connected winding, the third and fifth coils being equal to each other but smaller than the second, fourth and sixth coils, the first and seventh coils being equal but smaller than the third and fifth coils, said first, third, fifth and seventh coils being serially connected to form one phase of a delta-connected winding, and a line terminal for said phase of said delta-connected winding connected between said thrid and fifth windings.

2. A system of three-phase power transformation comprising, in combination, a three-phase supply circuit, a pair of three-phase load circuits, a three-phase transformer having a pair of Y-connected windings and a delta-connected winding, each phase of said delta winding comprising a pair of separate multi-layer coils serially connected with each other, said coils being physically displaced from each other in their axial direction, one of said load circuits being connected to the phases of said delta winding at the junction points between the coils constituting each phase thereof, the remaining circuits being connected respectively to said Y-connected windings.

3. A three-phase power transformer comprising, in combination, a three-legged magnetic core, a pair of equal serially-connected multi-layer low voltage coils mounted adjacent each other on each of said legs in such a manner that each coil covers half the length of its leg, said pairs of coils being serially connected in a closed loop to form a delta-connected winding, the interconnection points between the pair of coils on each leg constituting the supply terminals for a low voltage three-phase load circuit, three high voltage coils mounted respectively on said legs over said low voltage coils and extending over substantially the entire length of their respective legs, said high voltage coils being Y-connected with the neutral grounded and being provided with input and output autotransformer terminals, the thickness of said coils being less than one-tenth the length of said legs whereby the coupling between the low voltage coils on each leg is low compared with the coupling between each high voltage coil and its associated pair of low voltage coils, a high voltage three-phase power circuit connected to one set of autotransformer terminals, an intermediate voltage three-phase power circuit connected to the other set of autotransformer terminals, and a low voltage three-phase auxiliary circuit connected to said supply terminals.

4. In a system for three-phase power transformation, in combination, a conductor constituting one phase conductor of a three-phase circuit, a winding constituting one phase of a Y-connected winding connected to said conductor, a second conductor constituting one phase conductor of a second three-phase circuit, and a second winding having a relatively low leakage impedance with respect to the first-mentioned winding, said second winding constituting one phase of a delta-connected winding, said second winding being provided with a tap intermediate its terminals, said second conductor being connected to said tap, said tap dividing said second winding into two multi-layer parts, said two parts having a relatively high leakage impedance with respect to each other.

5. In a three-phase transformer system, a delta-connected winding having equal phases each comprising a multi-layer section A serially connected with a multi-layer section B, a three-phase circuit having three terminals connected respectively to the junction points of sections A and B within each of said phase windings, the ratio of the total turns of sections A and B being $p$, a Y-winding having equal phases comprising three star-connected windings C, a second three-phase circuit whose phase conductors are connected respectively to said windings C, the percentage leakage impedances $Z_{A-B}$, $Z_{A-C}$ and $Z_{B-C}$ respectively of the three pairs of windings A—B, A—C and B—C per phase being so proportioned as to give a predetermined ratio $k$ of the percentage zero phase sequence impedance $Z_0$ of the transformer to its percentage positive phase sequence leakage impedance $Z_+$ according to the formula $$k=\frac{Z_0}{Z_+}=2(1-3p+3p^2)\frac{pZ_{A-C}+(1-p)Z_{B-C}-p(1-p)Z_{A-B}}{(1-p)(2-3p)Z_{B-C}+p(1-p)Z_{A-B}-p(1-3p)Z_{A-C}}$$

6. A system for three-phase power transformation comprising, in combination, a pair of three-conductor three-phase circuits, a Y-connected winding connected to one of said circuits, a delta-connected winding whose phase windings are symmetrically located with respect to the corresponding phase windings of said Y-connected winding, the other of said three-phase circuits being connected symmetrically to intermediate points in the phases of said delta winding, the two sections into which each delta phase winding is electrically divided by this intermediate point being multi-layer sections which are physically displaced from each other and asymmetrically located with respect to their corresponding Y-phase winding whereby the leakage impedances between said sections themselves and between their corresponding Y-phase winding and said sections individually are high compared to the leakage impedance between the corresponding Y and delta phase windings.

7. A system of three-phase power transformation comprising, in combination, Y-connected primary and secondary windings, a delta-connected tertiary winding, and terminals for a three-phase load circuit connected to the electrical midpoints of the phases of the tertiary winding, the coils of the two halves of each of said phases being axially displaced with respect to each other.

8. A system of three-phase power transformation comprising, in combination, a three-legged magnetic core, a pair of equal serially-connected low voltage coils mounted adjacent each other on each of said legs in such a manner that each coil covers half the length of its leg, said pairs of coils being serially connected in a closed loop to form a delta-connected winding, the interconnection points between the pair of coils on each leg constituting the supply terminals for a low voltage three-phase load circuit, and three high voltage coils mounted respectively on said legs over said low voltage coils and extending over substantially the entire length of their respective legs, said high voltage coils being Y-connected with the neutral grounded and being provided with input and output autotransformer terminals, the thickness of said coils being less than one-tenth the length of said legs whereby the coupling between the low voltage coils on each leg is low compared with the coupling between each high voltage coil and its associated pair of low voltage coils.

9. In a transformer, a winding constituting one phase of a Y-connected winding, and a second winding having a relatively low leakage impedance with respect to the first-mentioned winding, said second winding constituting one phase of a delta-connected winding, said second winding being provided with a tap intermediate its terminals for connection to one line of a set of three phase lines for loading said delta winding symmetrically, said tap dividing said second winding into two parts, said two parts having a relatively high leakage impedance with respect to each other.

10. A system of three-phase power transformation comprising a delta-connected winding having equal phases each comprising a section A serially connected with a section B, the terminals of said winding being the junction points of sections A and B within each phase winding, the ratio of the turns of section A to the total turns of sections A and B being $p$, and a Y-winding having equal phases comprising three-star-connected windings C, the percentage leakage impedances $Z_{A-B}$, $Z_{A-C}$ and $Z_{B-C}$ respectively of the three pairs of windings A—B, A—C and B—C per phase being so proportioned as to give a predetermined ratio $k$ of the percentage zero phase sequence impedance $Z_0$ of the transformer to its percentage positive phase sequence leakage impedance $Z_+$ according to the formula $$k=\frac{Z_0}{Z_+}=2(1-3p+3p^2)\frac{pZ_{A-C}+(1-p)Z_{B-C}-p(1-p)Z_{A-B}}{(1-p)(2-3p)Z_{B-C}+p(1-p)Z_{A-B}-p(1-3p)Z_{A-C}}$$

11. A system of three-phase power transformation comprising, in combination, a Y-connected winding, a delta-connected winding whose phase windings are symmetrically located with respect to the corresponding phase windings of said Y-connected winding, and terminals for a three-phase circuit connected to electrically intermediate points in the phases of said delta winding, the two sections into which each delta phase winding is electrically divided by its intermediate point being physically displaced from each other and asymmetrically located with respect to their corresponding Y-phase winding whereby the leakage impedances between said sections themselves and between their corresponding Y-phase winding and said sections individually are high compared to the leakage impedance between the corresponding Y and delta phase windings.

12. A system of three-phase power transformation comprising, in combination, three Y-connected phase windings having a grounded neutral and constituting collectively a three-phase primary winding, three other phase windings closely coupled respectively to the first three phase windings, said other three windings being Y-connected with a grounded neutral and constituting collectively a secondary winding, and three additional phase windings closely coupled respectively to the other three pairs of closely coupled phase windings, said additional phase windings being delta connected so as collectively to constitute a tertiary winding, said additional windings each being similarly divided into two serially-connected main parts which are loosely coupled with respect to each other in comparison with the close coupling between corresponding phase windings, the three-phase terminals of said delta winding being connected respectively directly to the junction points of the main parts of each of said additional phase windings as distinguished from the corners of said delta winding.

ALEXIS N. GARIN.